(12) United States Patent
Jin et al.

(10) Patent No.: US 11,705,575 B2
(45) Date of Patent: Jul. 18, 2023

(54) BATTERY MODULE, BATTERY PACK, AND VEHICLE

(71) Applicant: Contemporary Amperex Technlogy Co., Limited, Fujian (CN)

(72) Inventors: Haizu Jin, Zhangwan Town (CN); Linggang Zhou, Zhangwan Town (CN); Dongyang Shi, Zhangwan Town (CN); Peng Wang, Zhangwan Town (CN); Yongshou Lin, Zhangwan Town (CN); Yanhuo Xiang, Zhangwan Town (CN)

(73) Assignee: Contemporaty Amperex Technlogy Co., Limited, Ningde (CN)

( * ) Notice: Subject to any disclaimer, the term of this patent is extended or adjusted under 35 U.S.C. 154(b) by 401 days.

(21) Appl. No.: 16/528,888

(22) Filed: Aug. 1, 2019

(65) Prior Publication Data

US 2020/0212386 A1 Jul. 2, 2020

(30) Foreign Application Priority Data

Dec. 30, 2018 (CN) .......................... 201811649795.3

(51) Int. Cl.
*H01M 10/04* (2006.01)
*H01M 10/48* (2006.01)
(Continued)

(52) U.S. Cl.
CPC ..... *H01M 10/0413* (2013.01); *H01M 10/425* (2013.01); *H01M 10/441* (2013.01);
(Continued)

(58) Field of Classification Search
CPC .......................... H01M 10/0413; H01M 50/20
See application file for complete search history.

(56) References Cited

U.S. PATENT DOCUMENTS 7,858,224 B2 * 12/2010 Kim ........................ B60L 58/26
429/153
8,980,457 B2 3/2015 Kim et al.
(Continued)

FOREIGN PATENT DOCUMENTS

CN 1224934 A 8/1999
CN 102110799 A 6/2011
(Continued)

OTHER PUBLICATIONS

Notice of Reasons for Refusal received in the corresponding Japanese Application 2019-155298, dated Sep. 4, 2020.
(Continued)

*Primary Examiner* — Ula C Ruddock
*Assistant Examiner* — Thomas H. Parsons
(74) *Attorney, Agent, or Firm* — Kilpatrick Townsend & Stockton LLP

(57) ABSTRACT

The present disclosure relates to the technical field of energy storage devices, and discloses a battery module, a battery package and a vehicle. The battery module can include a plurality of battery cells arranged in a horizontal direction, the battery cell can include an electrode assembly and a battery case, and the electrode assembly can be accommodated in the battery case. The electrode assembly can include a first electrode sheet, a second electrode sheet, and a separator disposed between the first and second electrode sheets, wherein the dimension of the battery module in the horizontal direction can be larger than that in the vertical direction of the battery module. The electrode assembly can be of a wound structure or of a laminated structure. The present disclosure can effectively reduce the expansion deformation of the battery module.

10 Claims, 13 Drawing Sheets

(51) Int. Cl.
  *H01M 10/44*   (2006.01)
  *H01M 10/42*   (2006.01)
  *H01M 50/55*   (2021.01)
  *H01M 50/264*  (2021.01)
  *H01M 50/209*  (2021.01)

(52) U.S. Cl.
  CPC ....... *H01M 10/482* (2013.01); *H01M 50/209* (2021.01); *H01M 50/264* (2021.01); *H01M 50/55* (2021.01)

(56) References Cited

U.S. PATENT DOCUMENTS

| | | | |
|---|---|---|---|
| 9,065,130 B2* | 6/2015 | Guen | H01M 50/572 |
| 9,425,479 B2 | 8/2016 | Kim | |
| 2006/0093890 A1* | 5/2006 | Steinbroner | H01M 8/248 |
| | | | 429/511 |
| 2007/0015050 A1* | 1/2007 | Jung | H01M 50/20 |
| | | | 429/152 |
| 2011/0151312 A1 | 6/2011 | Kim | |
| 2011/0183171 A1 | 7/2011 | Moon et al. | |
| 2012/0009464 A1* | 1/2012 | Nakazawa | C25D 3/38 |
| | | | 429/163 |
| 2012/0114992 A1 | 5/2012 | Kim et al. | |
| 2014/0315073 A1* | 10/2014 | Kim | H01M 50/531 |
| | | | 429/160 |
| 2015/0135522 A1 | 5/2015 | Seto et al. | |
| 2016/0218388 A1 | 7/2016 | Kim et al. | |
| 2016/0293922 A1 | 10/2016 | Umeyama et al. | |
| 2016/0308186 A1* | 10/2016 | Han | H01M 50/293 |
| 2017/0338509 A1* | 11/2017 | Cho | H01M 50/124 |

FOREIGN PATENT DOCUMENTS

| | | | |
|---|---|---|---|
| CN | 102544569 A | 7/2012 | |
| CN | 209344217 U | 9/2019 | |
| CN | 209447877 U | 9/2019 | |
| CN | 209447944 U | 9/2019 | |
| CN | 209447945 U | 9/2019 | |
| CN | 209447946 U | 9/2019 | |
| CN | 209447950 U | 9/2019 | |
| EP | 2413421 A1 | 2/2012 | |
| JP | 2001143757 A | 5/2001 | |
| JP | 2007073509 A | 3/2007 | |
| JP | 2007073590 A | 3/2007 | |
| JP | 2012033306 A | 2/2012 | |
| WO | WO-2012009145 A2 * | 1/2012 | ............ B60L 50/64 |
| WO | 2014024424 A1 | 2/2014 | |

OTHER PUBLICATIONS

Decision to Grant a Patent received in the corresponding Japanese Application 2019-155298, dated Dec. 15, 2020.
The first Office Action received in the corresponding European Application 19205799.0, dated Jan. 11, 2021.
The second Office Action received in the corresponding European Application 19205799.0, dated Jun. 29, 2021.
Decision to Grant a Patent received in the corresponding European Application 19205799.0, dated Dec. 15, 2021.
Arora et al, "Review of mechanical design and strategic placement technique of a robust battery pack for electric vehicles", Renewable and Sustainable Energy Reviews, vol. 60, pp. 1319-1331, (2016).
Extended European Search Report issued in EP Application No. 19205799.0, dated May 6, 2020, 11 pages.
Schroder et al, "Comparatively assessing different shapes of lithium-ion battery cells", Procedia Manufacturing, vol. 8, pp. 104-111 (2017).
PCT International Application No. PCT/CN2019/120114, International Search Report of the International Searching Authority, dated Jan. 13, 2020, 4 pages.
PCT International Application No. PCT/CN2019/120114, Written Opinion of the International Searching Authority, dated Jan. 13, 2020, 5 pages.

* cited by examiner

BATTERY MODULE, BATTERY PACK, AND VEHICLE

PRIORITY

This application claims priority to C.N. Application No. CN201811649795.3 filed on Dec. 30, 2018, which is incorporated by reference herein.

FIELD

This disclosure generally relates to the field of energy storage devices, and in particular, to a battery module, a battery pack, and a vehicle.

BACKGROUND

A secondary battery is a type of electrical battery which can be charged, discharged into a load, and recharged many times, as opposed to a disposable or primary battery, which is supplied fully charged and discarded after use. A secondary battery has the advantages of high energy density, long service life, energy saving and being environmentally friendly, and is widely used in various fields such as new energy vehicles, energy storage power stations and the like.

A plurality of battery cells are usually stacked together and electrically connected to each other through bus bars to form a battery module. In order to fix the plurality of battery cells, end plates and side plates are usually provided in a battery module. The end plates and the side plates are connected to each other to form a module frame, and the plurality of battery cells are fixed within the module frame.

Battery cells can undergo expansive deformation during use, and the expansive deformation is particularly drastic in the direction of the longest dimension of the battery module. To limit the expansion of the battery cells, the volume of end plates in conventional battery modules are relatively large, resulting in a low energy density of the battery module, which is disadvantageous for the weight reduction of the battery module.

SUMMARY

Disclosed herein is a battery module including a plurality of bus bars and a plurality of battery cells arranged in a horizontal direction and electrically connected to each other by the plurality of bus bars. The battery cells each can include a battery case and an electrode assembly accommodated in the battery case. The electrode assembly can include a first electrode sheet, a second electrode sheet, and a separator disposed between the first and second electrode sheets. The electrode assembly can have a flat wound structure, an outer surface of the electrode assembly can include two flat faces that face each other in the vertical direction. Or the electrode assembly can have a laminated structure, in which the first and second electrode sheets and the separator can be stacked in the vertical direction. A dimension of the battery module in the horizontal direction can be larger than a dimension in a vertical direction.

In some embodiments, the battery case can include two first surfaces and two second surfaces, an area of the first surface can be larger than an area of the second surface; the two second surfaces of each of the battery cells can face each other in the horizontal direction, and the two first surfaces of each of the battery cells can face each other in the vertical direction.

In some embodiments, the battery cell can include a plurality of the electrode assemblies, and the plurality of the electrode assemblies can be stacked in the vertical direction. In some embodiments, in the battery module, the number of layers of the battery cells stacked in the vertical direction can be about one to five layers. In some embodiments, the number of layers of the battery cells stacked in the vertical direction can be about two layers or three layers.

In some embodiments, the battery case can include a third surface, the two first surfaces and the two second surfaces can collectively surround the third surface, and the area of the first surface can be larger than an area of the third surface.

In some embodiments, the battery cell can include a first electrode terminal and a second electrode terminal, and the first electrode terminal and the second electrode terminal can both be arranged on the third surface.

In some embodiments, the battery module can include a tying band surrounding an outer periphery of the plurality of battery cells, the tying band can include two long sides and two short sides, the long sides can face the first surface and extending in the horizontal direction, the short sides can face the second surface and extending in the vertical direction. In some embodiments, the battery module can include at least two tying bands, and the tying bands are spaced apart.

In some embodiments, the tying band can include a first end portion and a second end portion, the first end portion and the second end portion can be stacked in the vertical direction to form a joint portion, and the joint portion and the first surface can face each other. In some embodiments, the tying band can include a first end portion and a second end portion, the first end portion and the second end portion can be stacked in the horizontal direction to form a joint portion, and the joint portion and the second surface can face each other. In some embodiments, the joint portions of the at least two tying bands are arranged in a straight line.

In some embodiments, the battery module can include two end plates, which can be respectively arranged at two ends of the plurality of battery cells in the horizontal direction, and the tying band can surround the outer periphery of the plurality of battery cells and the two end plates.

In some embodiments, a surface of the end plate away from the battery cell can be provided with a tying band limiting slot, the tying band limiting slot can extend along the vertical direction, and the short side of the tying band can be received in the tying band limiting slot. In some embodiments, the end plate can be internally provided with a tying band limiting hole, the tying band limiting hole can extend along the vertical direction, and the short side of the tying band can pass through the tying band limiting hole.

In some embodiments, a ratio of the dimension of the battery module in the horizontal direction to the dimension of the battery module in the vertical direction can be greater than or equal to four.

Also disclosed herein is a battery pack including a box body, which can include an accommodating chamber and a plurality of the battery modules as discussed above, wherein the plurality of battery modules can be arranged in the accommodating chamber. Further disclosed herein is a vehicle including a vehicle body and the battery pack as discussed above, wherein the battery pack can be arranged in the vehicle body.

Further disclosed herein is a battery cell including a battery case and an electrode assembly accommodated in the battery case, the electrode assembly can include a first electrode sheet, a second electrode sheet, and a separator disposed between the first and second electrode sheets. The electrode assembly can have a flat wound structure, an outer surface of the electrode assembly including two flat faces that face each other in a vertical direction. Or the electrode assembly can have a laminated structure, in which the first and second electrode sheets and the separator can be stacked in the vertical direction

BRIEF DESCRIPTION OF DRAWINGS

In order to facilitate a full understanding of the present disclosure, reference is now made to the accompanying drawings, in which like elements are referenced with like numerals. These drawings should not be construed as limiting the present disclosure, but are intended to be illustrative only. The drawings are not necessarily to scale, or inclusive of all elements of a system, emphasis instead generally being placed upon illustrating the concepts, structures, and techniques sought to be protected herein.

DESCRIPTION

Figure 1:
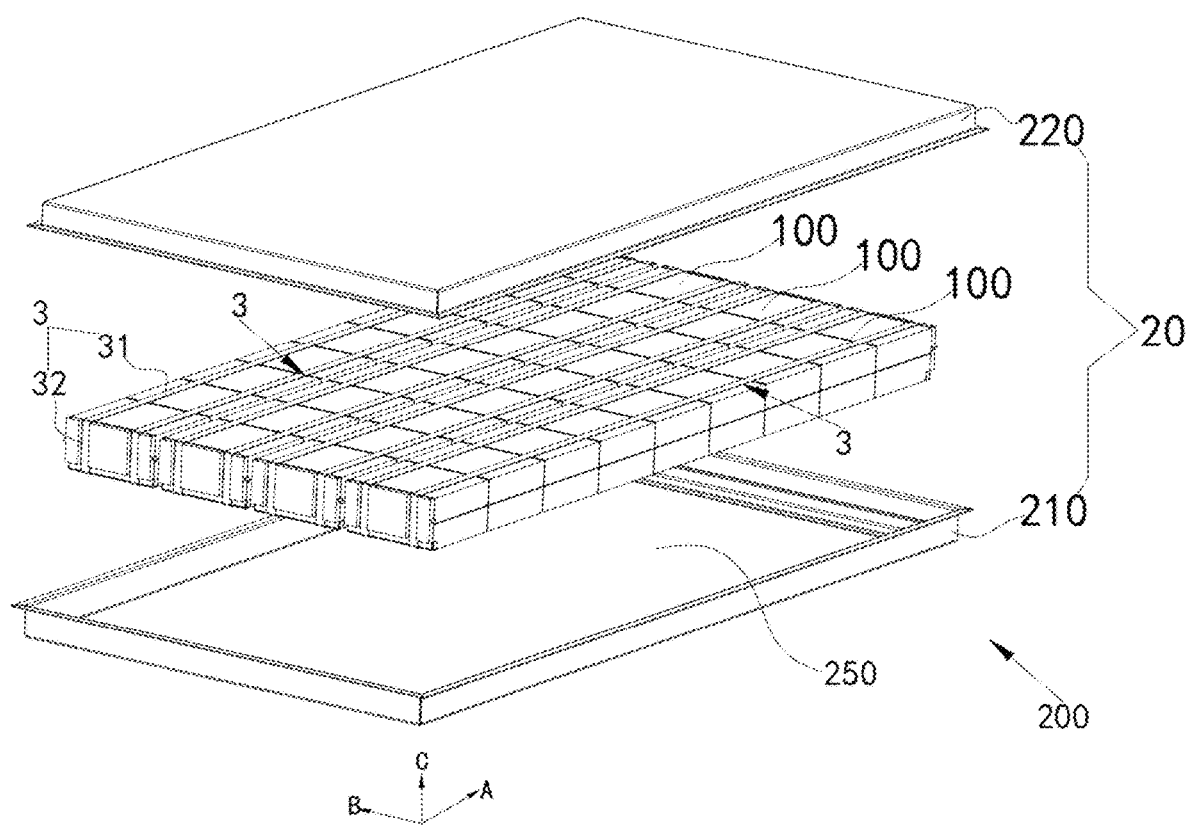
FIG. 1 is an exploded view of a battery pack, according to some embodiments of the present disclosure.

The battery cell, battery module, battery pack, and vehicle according to the present disclosure will be further described in detail with reference to the accompanying drawings.

The elements in the figures are described in the following:
100: battery module
1: battery cell
11: electrode assembly
12: battery case
13: cover assembly
131: first electrode terminal
132: second electrode terminal
14: adapter piece
111: first electrode sheet
112: second electrode sheet
113: separator
114: flat face
115: narrow face
110: first surface
120: second surface
130: third surface
2: end plate
21: main body of the end plate
22: tying band limiting slot
23: fixed limiting hole
24: first protruding portion
200: battery pack
20: box body
210: lower box body
220: upper box cover
220-1: second protruding portion
230: top glue
240: bottom glue
250: accommodating chamber
3: tying band
31: long side
32: short side
310: first end portion
320: second end portion
330: joint portion
4: insulation part
5: bus bar In the description of the present disclosure, the terms "first" and "second" are used for descriptive purposes only, and should not be construed as indicating or implying the relative importance thereof, unless otherwise specified or explained. The term "a plurality of" means two or more; the terms "connected", "fixed" and the like should be understood broadly. For example, "connected" may be a fixed connection, or a detachable connection, or an integral connection, or an electrical connection; it may be directly connected or indirectly connected though an intermediate medium. For a person of ordinary skill in the art, the specific meanings of the above terms in the present disclosure can be understood in their specific contexts.

In the description of the present disclosure, the direction indicated by arrow A in all the drawings is the length direction, the direction indicated by arrow B is the width direction, and the direction indicated by arrow C is the vertical direction. The horizontal direction is a direction parallel to the horizontal plane, and may be the above-described length direction or the above-described width direction. In addition, the horizontal direction includes not only the direction that is absolutely parallel to the horizontal plane, but also the direction generally parallel to the horizontal plane as conventionally recognized in engineering. The vertical direction is the direction perpendicular to the horizontal plane, and the vertical direction includes not only the direction absolutely perpendicular to the horizontal plane, but also the direction generally perpendicular to the horizontal plane as conventionally recognized in engineering. In addition, the terms "upper", "lower", "top", "bottom" and the like are understood relative to the vertical direction.

The type of battery in the present disclosure can include, but is not limited to, lithium ion battery, aluminum ion battery, carbon battery, flow battery, lead-acid battery, glass battery, magnesium ion battery, metal air battery, molten salt battery, nickel cadmium battery, nickel hydrogen battery, nickel iron battery, nickel metal hydride battery, nickel zinc battery, organic radical battery, polymer-based battery, fuel cell, lithium sulfur battery, sodium ion battery, sodium sulfur battery, and zinc ion battery. In some embodiments, the battery can be a lithium ion battery.

An electrode assembly will inevitably expand in the direction of the thickness of an electrode during the processes of charging and discharging. In the electrode assembly of a wound structure, the expansion force is the largest in a direction perpendicular to the flat surface; while in the electrode assembly of a laminated structure, the expansion force is the largest in the stacking direction of the first electrode and the second electrode. In the state-of-the-art technology, for the battery cells in a battery module, the direction in which the electrode assembly applies the largest expansion force to the battery case is the horizontal direction. Since the dimension of a battery module in the horizontal direction is much larger than that in the vertical direction. For example, it is limited by the chassis height of a vehicle, more battery cells are required to be stacked in the horizontal direction, and a large expansion force is thus accumulated in this direction. For the current battery module, the expansion force in the horizontal direction is very large. Hence, it is necessary to provide a very thick end plate on both sides of the battery module in the horizontal direction in order to resist the expansion force, while an increase in the thickness of the end plate would reduce the energy density of the battery module. In the solution disclosed herein, the electrode assembly may be of a wound structure or a laminated structure; when the electrode assembly is of a wound structure, the flat face would face the vertical direction, when the electrode assembly is of a laminated structure, the first electrode and the second electrode would be stacked in the vertical direction. Thus, regardless the electrode assembly adopts a wound structure or a laminated structure, the direction in which the electrode assembly applies the largest expansion force to the battery case is the vertical direction. The direction in which the electrode assembly applies the largest expansion force to the battery case is toward the vertical direction; in addition, the number of battery cells stacked in the vertical direction is the lowest. Therefore, compared with the state-of-the-art technology, the disclosed solution is able to reduce the largest expansion force of the battery module, so that a smaller-sized end plate can be used, thereby increasing the energy density of the battery module.

In some embodiments, a vehicle is provided, the vehicle can include a vehicle body and a battery pack, the battery pack can be disposed in the vehicle body. The battery pack can be a battery pack 200 as illustrated in FIG. 1. The vehicle can be a new energy vehicle, which can be an electric vehicle, a hybrid vehicle or a range extended electric vehicle (REEV). A driving motor can be arranged in the main body of the vehicle, and the driving motor can be electrically connected with the battery pack. The battery pack can provide electric energy, and the driving motor can be connected to the vehicle wheels of the vehicle body via a transmission mechanism, so as to drive the vehicle to move. In some embodiments, the battery pack can be disposed horizontally at the bottom portion of the vehicle main body.

FIG. 1 is an exploded view of a battery pack 200, according to some embodiments of the present disclosure. Battery pack 200 can include a box body 20 and a plurality of battery modules 100. Box body 20 can include a lower box body 210 and an upper box cover 220. Upper box cover 220 and lower body box 210 of battery pack 200 are depicted as separated in FIG. 1.

Lower box body 210 and upper box cover 220 can cooperate with each other to form an enclosed box body having accommodating chamber 250, and the plurality of battery modules 100 can be located within accommodating chamber 250. In some embodiments, box body 20 can be made of metal materials or non-metal material. Exemplary metal materials can include, but not limited to aluminum and aluminum alloy. The plurality of battery modules 100 may be arranged side by side along the length direction of battery pack 200, or the plurality of battery modules 100 may be arranged side by side in the width direction of battery pack 200. Battery module 100 can have a plurality of battery cells 1 (not shown in FIG. 1), and the plurality of battery cells 1 in battery module 100 can be wrapped together through tying band 3, wherein one battery module 100 can be provided with two or more tying bands 3. The tying band can include two long sides 31 and two short sides 32, wherein long side 31 can extend in a horizontal direction (for example, the length direction indicated by arrow A), and short side 32 can extend in a vertical direction (the direction indicated by arrow C).

Figure 2:
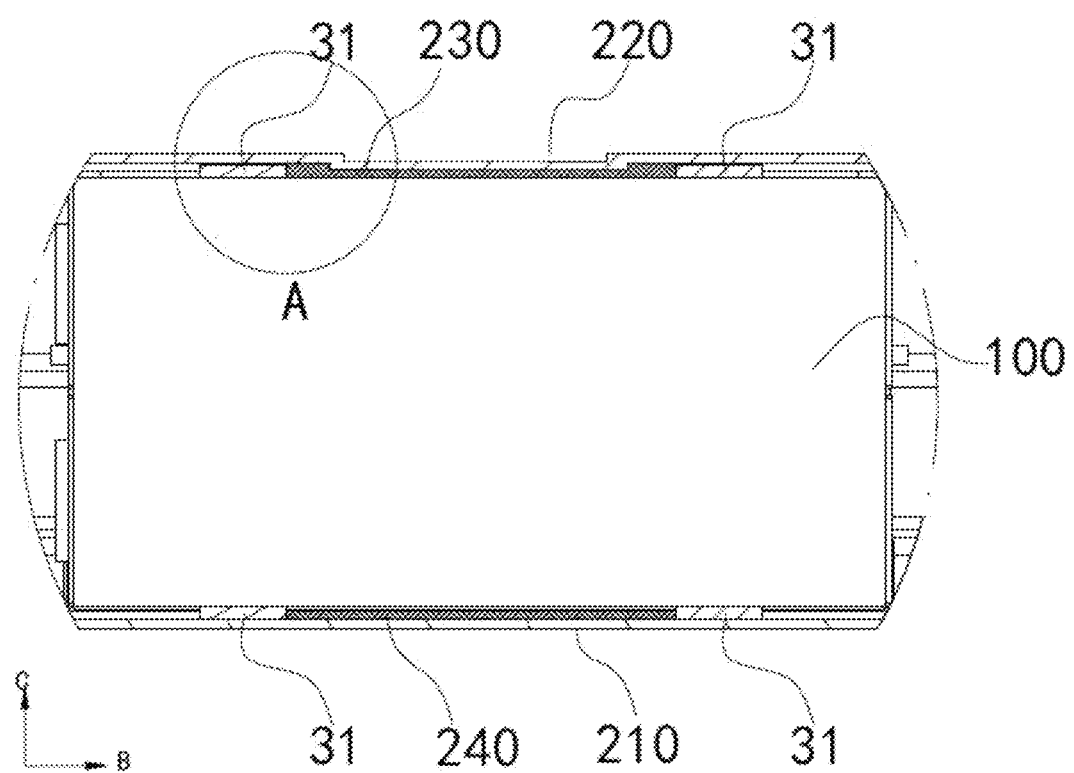
FIG. 2 is a cross-sectional view of the battery pack showing a battery module and a box body being bonded together, according to some embodiments of the present disclosure.

FIG. 2 is a cross-sectional view of battery pack 200 showing the binding of battery module 100 and box body 20, according to some embodiments of the present disclosure. A top glue 230 can be disposed between the top portion of battery module 100 and upper box cover 220 of box body 20. A bottom glue 240 can be disposed between the bottom portion of battery module 100 and lower box body 210 of box body 20. In this way, battery module 100 can be connected and fastened to box body 20 through top glue 230 and bottom glue 240.

Top glue 230 and bottom glue 240 can be disposed between long sides 31 of two adjacent tying bands on battery module 100. Accordingly, long sides 31 of two adjacent tying bands 3 can restrict top glue 230 and bottom glue 240 from overflowing before they are solidified, such that top glue 230 can be ensured to be effectively bonded to the top portion of battery module 100 and upper box cover 220, and bottom glue 240 can be ensured to be effectively bonded to the bottom portion of battery module 100 and lower box body 210.

Battery module 100 can be connected to box body 20 through top glue 230 and bottom glue 240, such that battery module 100 and box body 20 can form an integral body. The connection strength between box body 20 and battery module 100, therefore, can be enhanced and the overall stiffness of the battery pack can be improved.

In some embodiments, the surface of tying band 3 can be in contact with a first surface 110 of battery cell 1, the inner surface of upper box cover 220 can be in contact with the other surface of tying band 3. Accordingly, upper box cover 220, tying band 3 and battery cell 1 can be in close contact with each other. Top glue 230 can be located within the space formed by long sides 31 of two adjacent tying bands 3, upper surface 110 of battery cell 1, and the inner surface of upper box cover 220, the thickness of top glue 230 can be equal to the thickness of tying band 3. Accordingly, the thickness of top glue 230 can be accurately controlled. Similarly, long sides 31 of adjacent tying bands 3 located at the bottom of battery cell 1 can also be in close contact with lower box body 210 and the surface of the battery cell 1, such that the thickness of bottom glue 240 located at the bottom portion of the battery cell 1 can be equal to the thickness of tying band 3.

Figure 3:
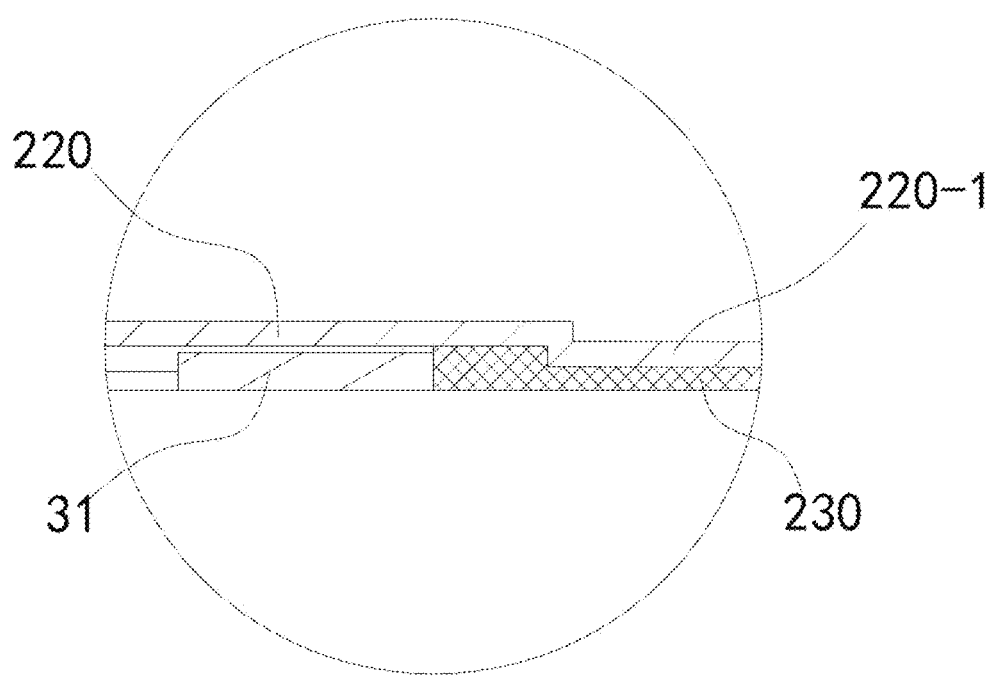
FIG. 3 an enlarged view of portion A in FIG. 2, according to some embodiments of the present disclosure.

FIG. 3 is an enlarged view of the portion A shown in FIG. 2, according to some embodiments of the present disclosure. The inner surface of upper box cover 220 can be provided with a downward second protruding portion 220-1, and second protruding portion 220-1 can be bonded to top glue 230. Second protruding portion 220-1 can be located between long sides 31 of two adjacent tying bands 3, that is, second protruding portion 220-1 can protrude toward the position of top glue 230. A separate space for accommodating top glue 230 can be saved between the end of second protruding portion 220-1 and the upper surface of battery cell 1. In this way, the thickness of top glue 230 can be smaller than the thickness of tying band 3. Second protruding portion 220-1 on upper box cover 220 can be formed by means of stamping by a die, that is, stamping toward the upper surface of upper box cover 220 by the die, such that the upper surface of upper box cover 220 can be concave downward and the lower surface thereof can be convex downward. In some embodiments, second protruding portion 220-1 can be formed by providing a reinforcing sheet or a reinforcing strip on the upper surface of upper box cover 220. Second protruding portion 220-1 can increase the structural strength of upper box cover 220. On the other hand, second protruding portion 220-1 can protrude toward the position of top glue 230 to press top glue 230 downward to make top glue 230 in full contact with battery cell 1 and tying band 3, ensuring the bonding strength between top glue 230, battery cell 1 and tying band 3.

Figure 4:
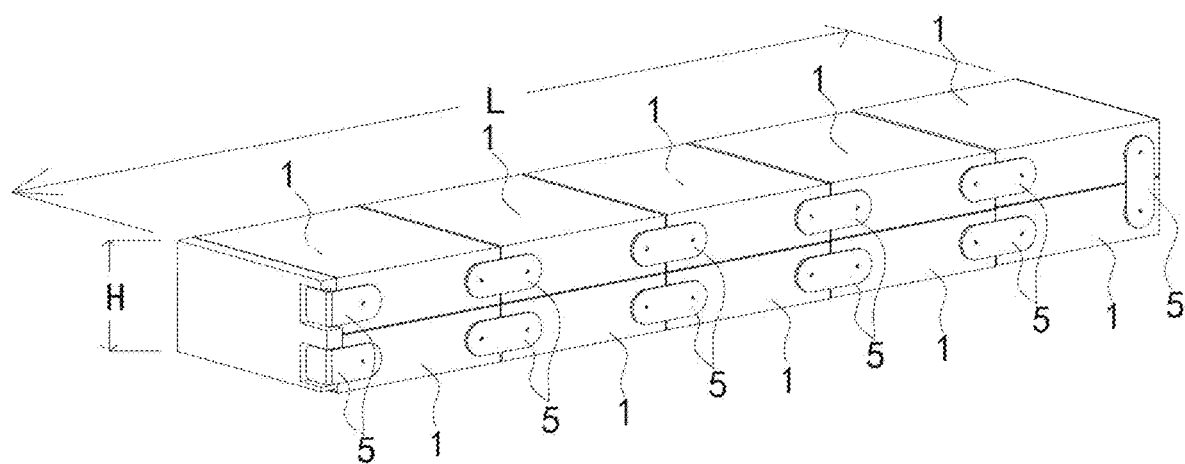
FIG. 4 is a schematic view of a battery module, according to some embodiments of the present disclosure.
Figure 5:
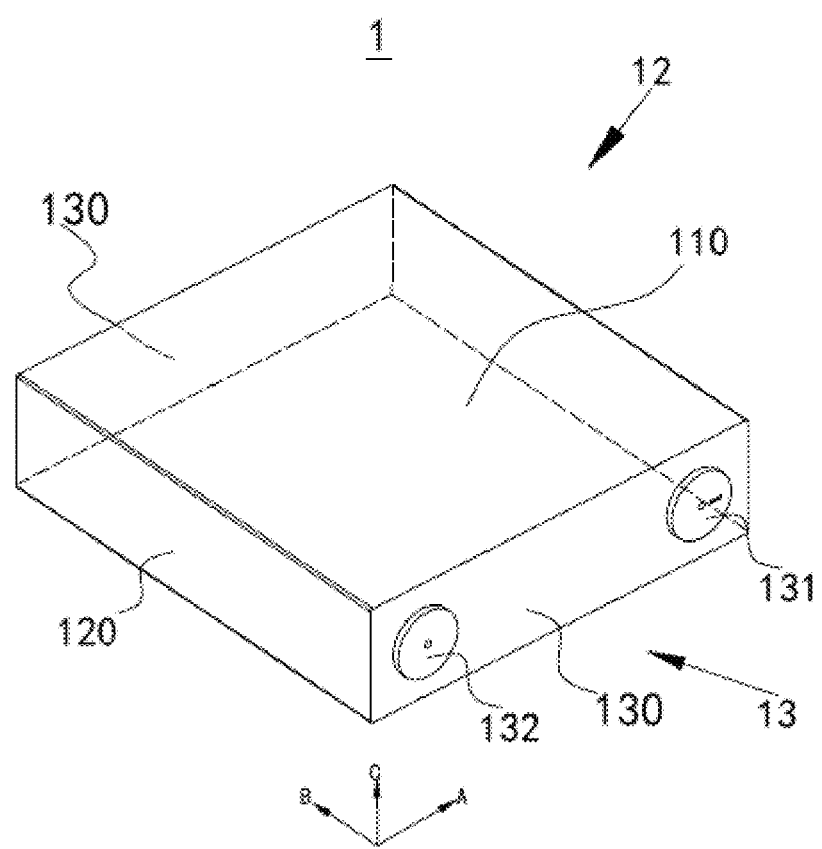
FIG. 5 is a schematic structural view of a battery cell, according to some embodiments of the present disclosure.
Figure 6:
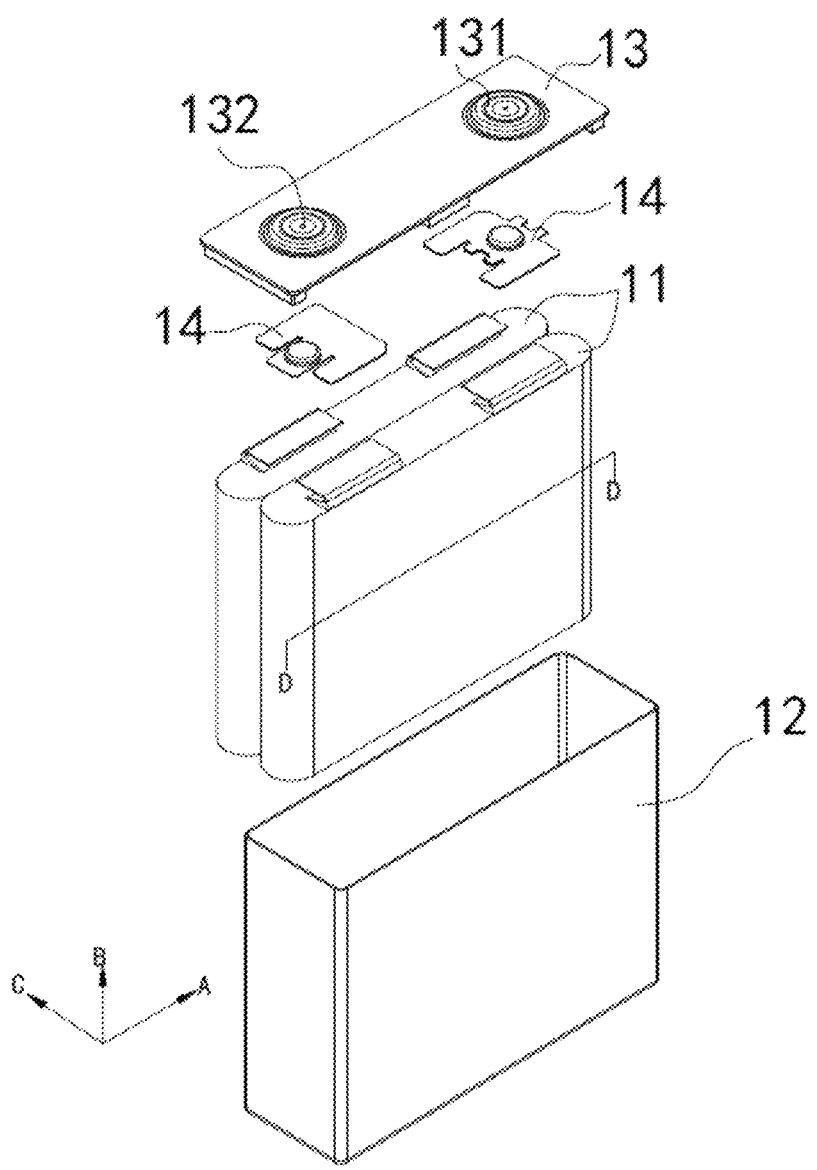
FIG. 6 is an exploded view of a battery cell, according to some embodiments of the present disclosure.
Figure 7A:
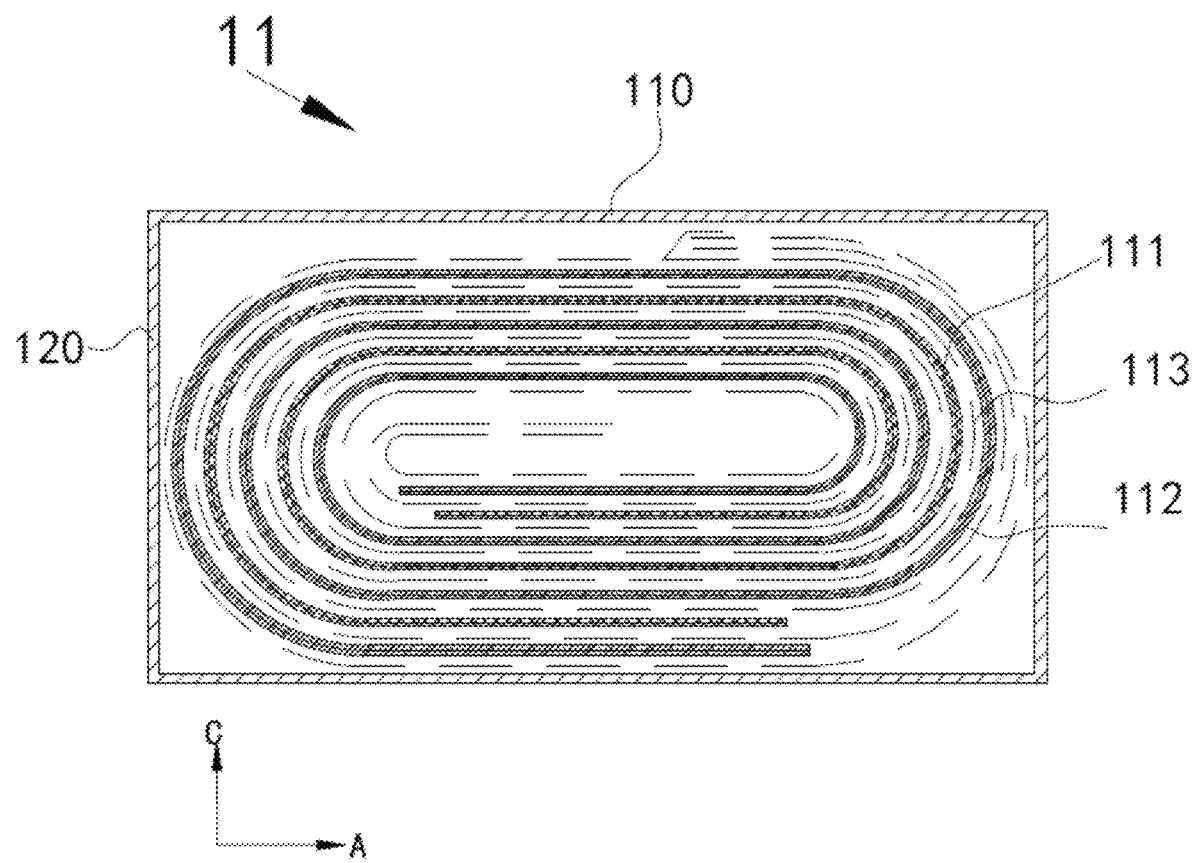
FIG. 7a is a cross-sectional view of an electrode assembly of a wound structure along the D-D line direction in FIG. 3, according to some embodiments of the present disclosure.
Figure 7B:
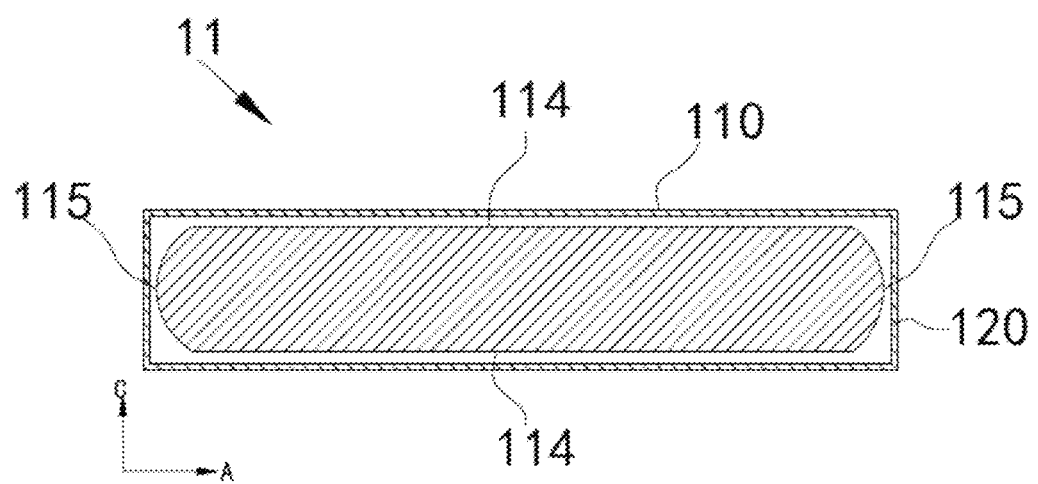
FIG. 7b is a schematic view of the outline of the cross section of an electrode assembly of a wound structure along the D-D line direction in FIG. 3, according to some embodiments of the present disclosure.
Figure 8:
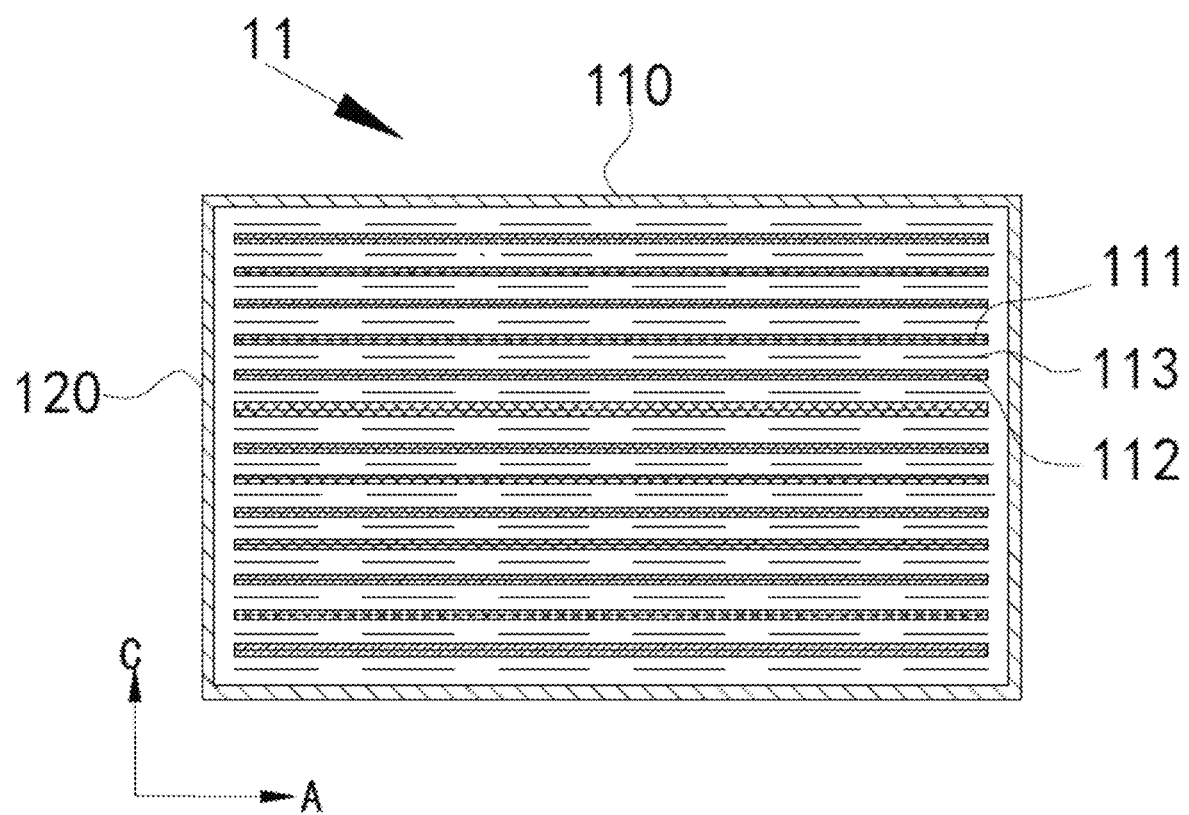
FIG. 8 is a cross-sectional view of an electrode assembly of a laminated structure along the D-D line direction in FIG. 3, according to some embodiments of the present disclosure.

FIG. 4 is a schematic structural view of a battery module, according to some embodiments of the present disclosure. FIG. 5 is a schematic structural view of a battery cell, according to some embodiments of the present disclosure. FIG. 6 is an exploded view of a battery cell, according to some embodiments of the present disclosure. FIG. 7a is a cross-sectional view of an electrode assembly of a wound structure along the D-D line direction shown in FIG. 3, according to some embodiments of the present disclosure. FIG. 7b is a schematic view of the outline of the cross section of an electrode assembly of a wound structure along the D-D line direction shown in FIG. 3, according to some embodiments of the present disclosure. FIG. 8 is a cross-sectional view of an electrode assembly of a laminated structure along the D-D line direction shown in FIG. 3, according to some embodiments of the present disclosure.

As shown in FIG. 4, battery module 100 can include a plurality of battery cells 1 arranged in a horizontal direction and a plurality of bus bars 5 electrically connected to the plurality of battery cells 1. Battery cell 1 can be a secondary battery that can be repeatedly charged and discharged, and the plurality of battery cells 1 are connected in series, in parallel, or in mixed connection through the bus bar 5. The dimension L of the battery module 100 in the horizontal direction can be larger than the dimension H of the battery module in the vertical direction.

As shown in FIGS. 5 and 6, battery cell 1 can include a battery case 12 and an electrode assembly 11. Battery case 12 can be made of metal or non-metal material. Exemplary metal materials can include, but not limited to aluminum, aluminum alloy, and nickel-plated steel. Battery case 12 may have a hexahedral shape or other shape, and can have an opening. Electrode assembly 11 can be accommodated in battery case 12. The opening of battery case 12 can be covered with a cover assembly 13. Cover assembly 13 can include a cover plate and two electrode terminals disposed on the cover plate, and the two electrode terminals can be a first electrode terminal 131 and a second electrode terminal 132, respectively. First electrode terminal 131 can be a positive electrode terminal, and second electrode terminal 132 can be a negative electrode terminal. In some embodiments, first electrode terminal 131 can be a negative electrode terminal, and second electrode terminal 132 can be a positive electrode terminal. The cover plate can be made of a metal or non-metal material. Exemplary metal materials can include, but not limited to aluminum and aluminum alloy. The size of the cover plate can be adapted to the size of the opening of battery case 12. The electrode terminals can be fixed to the cover plate by means of welding or by a fixing member such as a rivet. An adapter piece 14 can be disposed between cover assembly 13 and electrode assembly 11. The electrode lugs of electrode assembly 11 can be electrically connected to the electrode terminals on the cover plate through adapter piece 14. In some embodiments, there can be two adapter pieces 14, which can be respectively a positive electrode adapter and a negative electrode adapter.

As shown in FIG. 6, two electrode assemblies 11 can be provided in battery case 12, and the two electrode assemblies 11 can be stacked in the vertical direction (the direction indicated by arrow C). In some embodiments, one electrode assembly 11 can be disposed in battery case 12, or three or more electrode assemblies 11 can be disposed in the battery case. The plurality of electrode assemblies 11 can be stacked in the vertical direction (the direction indicated by arrow C).

As shown in FIG. 7a, FIG. 7b and FIG. 8, electrode assembly 11 can include a first electrode sheet 111, a second electrode sheet 112, and a separator 113 disposed between first electrode sheet 111 and second electrode sheet 112. First electrode sheet 111 can be a cathode and second electrode sheet 112 can be an anode. In some embodiments, first electrode sheet 111 can be an anode, and second electrode sheet 112 can be a cathode. Separator 113 can be an insulator provided between first electrode sheet 111 and second electrode sheet 112. The active material of a cathode or anode can be coated on the coating area of the electrode sheet. A portion extending from the coating area of a cathode electrode sheet can serve as a positive electrode lug; a portion extending from the coating area of an anode electrode sheet can serve as a negative electrode lug. The positive electrode lug can be connected to a positive electrode terminal on cover assembly 13 through a positive electrode adapter piece, and likewise, the negative electrode lug can be connected to a negative electrode terminal on cover assembly 13 through a negative electrode adapter piece.

As shown in FIG. 7a, electrode assembly 11 can be of a wound structure. First electrode sheet 111, separator 113, and second electrode sheet 112 can be strip-shaped structures. First electrode sheet 111, separator 113, and second electrode sheet 112 can be sequentially laminated and wound two or more times to form electrode assembly 11. In some embodiments, electrode assembly 11 can be in a flat shape. When electrode assembly 11 is fabricated, it can be first wound into a hollow cylindrical structure, and then flattened by pressure after being wound.

As shown in FIG. 7b, the outer surface of electrode assembly 11 can include two flat faces 114, and the two flat faces 114 can face each other in the vertical direction (the direction indicated by arrow C), that is, flat faces 114 and first surface 110 of battery case 12 can be oppositely arranged. Electrode assembly 11 can be substantially a hexahedral structure, and flat face 114 can be substantially parallel to the winding axis, and is the outer surface that has the largest area. Flat face 114 can be a relatively flat surface and is not required to be an absolutely flat surface. The two flat faces 114 are referred to in terms of narrow faces 115 on two sides of electrode assembly 11. In addition, the area of flat face 114 can be larger than narrow face 115 of electrode assembly 11.

As shown in FIG. 8, the electrode assembly 11 can have a laminated structure, that is, electrode assembly 11 can have a plurality of first electrode sheets 111 and a plurality of second electrode sheets 112, and separator 113 can be disposed between first electrode sheet 111 and second electrode sheet 112. First electrode sheets 111, separators 113, and second electrode sheets 112 can be stacked sequentially. Among them, first electrode sheets 111, separators 113, and second electrode sheets 112 can be stacked in the vertical direction (the direction indicated by arrow C).

Since electrode assembly 11 will inevitably expand in the thickness direction of the electrode during the processes of charging and discharging, in electrode assembly 11 of a wound structure, the expansion force is the largest in the direction perpendicular to flat face 114, while in electrode assembly 11 of a laminated structure, the expansion force is the largest in the stacking direction of first electrode sheet 111 and second electrode sheet 112.

In the conventional battery technology, in battery cells of battery module, the direction in which electrode assembly applies the largest expansion force to battery case is toward the horizontal direction. The dimension of battery module in the horizontal direction is much larger than the dimension thereof in the vertical direction. For example, limited by the chassis height dimension of a vehicle, more battery cells need to be stacked in the horizontal direction, and the expansion force is thus accumulated in this direction. Therefore, the expansion force of conventional battery module in the horizontal direction is very large, so it is necessary to provide the very thick end plates on both sides of battery module in the horizontal direction to resist the expansion force. However, an increase in the thickness of the end plate will reduce the energy density of battery module. In some embodiments according to the present disclosure, electrode assembly 11 can be of a wound structure or a laminated structure. In the case where electrode assembly 11 is of a wound structure, flat face 114 faces towards the vertical direction. In the case where electrode assembly is of a laminated structure, first electrode sheets 111 and second electrode sheets 112 are stacked in the vertical direction. It can be seen that regardless electrode assembly 11 adopts a wound structure or a laminated structure, the direction in which electrode assembly 11 applies the largest expansion force to battery case 12 is toward the vertical direction.

The direction in which electrode assembly 11 applies the largest expansion force to battery case 12 is toward the vertical direction, and the number of battery cells stacked in the vertical direction can be relatively small. As a result, the present disclosure can reduce the largest expansion force of battery module 100 compared to the conventional technology, and thus a smaller-sized end plate can be selected, thereby increasing the energy density of battery module 100.

As shown in FIG. 4, in battery module 100, the number of layers of the battery cells 1 stacked in the vertical direction (the direction indicated by arrow C) can be 2 layers. In some embodiments, the number of layers of battery cells 1 stacked in the vertical direction can be about 1 to 5 layers. In some embodiments, the number of layers of battery cells 1 stacked in the vertical direction can be about 2 layers or 3 layers.

In order to better balance the expansion force of battery module 100 in the horizontal direction and in the vertical direction, in some embodiments, the ratio of the dimension of the battery module 100 in the horizontal direction to the dimension of the battery module 100 in the vertical direction can be greater than or equal to about 1, 2, 3, 4, or 5. In some embodiments, the ratio of the dimension of the battery module 100 in the horizontal direction to the dimension of the battery module 100 in the vertical direction can be greater than or equal to about 4.

As shown in FIGS. 5 and 6, battery case 12 of battery cell 1 can have a substantially hexahedral structure, and battery case 12 can includes two first surfaces 110 and two second surfaces 120. The two second surfaces 120 in each of battery cells 1 can face each other in the horizontal direction (for example, the length direction indicated by arrow A), and the two first surfaces 110 in each of battery cells 1 can face each other in the vertical direction (for example, the direction indicated by arrow C). First surface 110 and second surface 120 can be transitioned therebetween by a right angle. Similarly, first surface 110 and second surface 120 can be transitioned therebetween by an arcuated curved surface or a curved surface with multiple bends. In some embodiments, the area of first surface 110 can be larger than the area of second surface 120.

Battery cell 1 may generate gas inside battery case 12 during the processes of charging and discharging, the generated gas exerts a force on battery case 12, which further aggravates the outward expansion of battery case 12. Since the area of first surface 110 of the present disclosure can be larger than the area of second surface 120, and the two first surfaces 110 of battery cells 1 can face each other in the vertical direction, the direction in which the generated gas exerts the largest force on battery case 12 is also in the vertical direction. Accordingly, the largest expansion force of battery module 100 can be further reduced compared to the conventional technology.

As shown in FIGS. 5 and 6, battery case 12 can further include a third surface 130. The two first surfaces 110 and the two second surfaces 120 can collectively surround third surface 130, and the area of first surface 110 can be larger than that of third surface 130. That is, first surface 110, second surface 120, and third surface 130 can be substantially perpendicular with each other, and can be connected to each other to form a cavity for accommodating electrode assembly 11. First surface 110 can face the vertical direction, and the area of first surface 110 can be larger than the area of second surface 120 or third surface 130. The areas of second surface 120 and third surface 130 can be equal, or the area of second surface 120 can be larger or smaller than the area of third surface 130.

In some embodiments of the battery pack, since top glue 230 and bottom glue 240 can be disposed between battery module 100 and upper box cover 220, and the direction of the largest expansion force of battery module 100 can be toward the vertical direction, battery module 100 can be more closely attached to top glue 230 and bottom glue 240 so as to prevent top glue 230 and bottom glue 240 from falling off.

As shown in FIG. 5, first electrode terminal 131 and second electrode terminal 132 on battery cell 1 can be disposed on third surface 130 of battery case 12, such that bus bar 5 connected to the electrode terminals can be located on one side of battery cell 1 where third surface 130 is located. Since the space of battery module 100 in the vertical direction is more valuable than the space in other directions, the arrangement of the bus bar on one side of first surface 130 can allow better utilization of the space on the side of battery module 100, thereby reducing the dimension of battery module 100 in the vertical direction. In particular, when battery module 100 is applied in a vehicle, e.g., at the bottom of the vehicle, by means of reducing the dimension of battery module 100 in the vertical direction, the ground clearance of the bottom of the vehicle can be increased, which helps to improve the vehicle's capacity to overcome obstacles.

Figure 9:
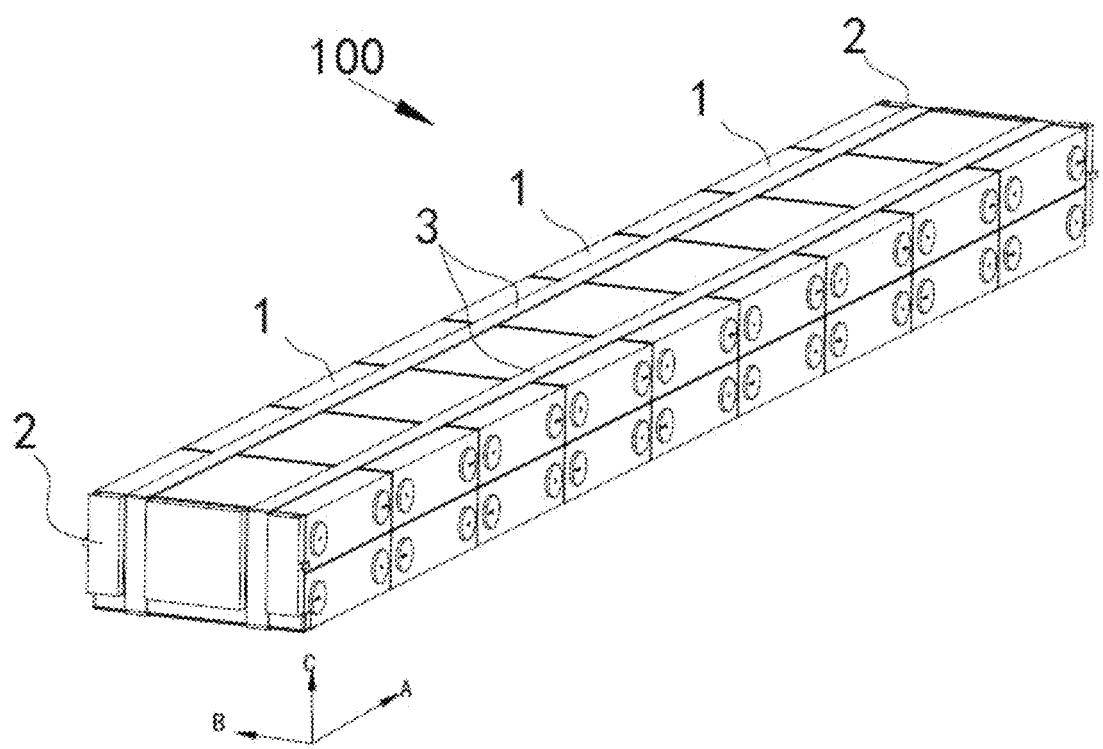
FIG. 9 is a schematic view of a battery module, according to some embodiments of the present disclosure.
Figure 10:
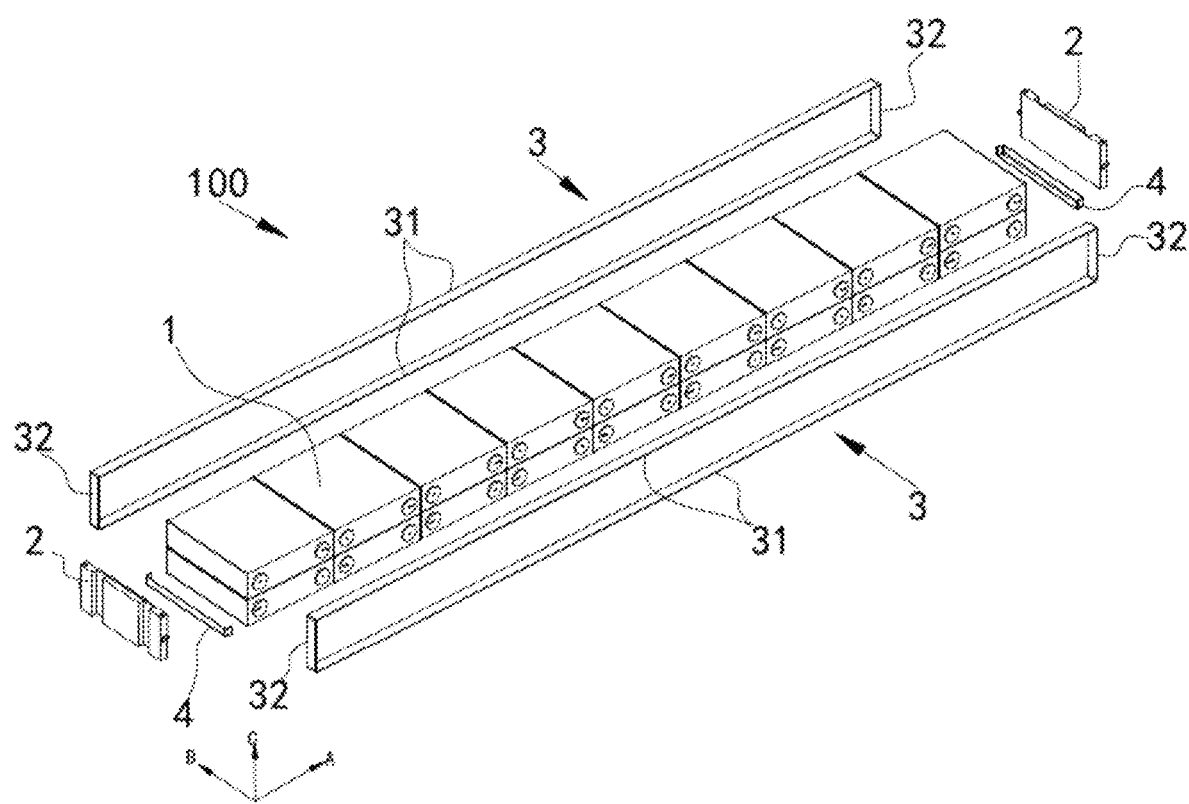
FIG. 10 is an exploded view of the battery module shown in FIG. 9, according to some embodiments of the present disclosure.

As shown in FIGS. 9 and 10, in some embodiments, battery module 100 can include a tying band 3, tying band 3 can surround the outer periphery of a plurality of battery cells 1, and can be head to tail connected by itself, such that the plurality of battery cells 1 can be tied together. Tying band 3 can be made of material including, but not limited to nylon, polypropylene and polyvinyl chloride, and can have good flexibility. In addition, the tying band can surround the plurality of battery cells 1 to form two long sides 31 and two short sides 32. Long side 31 and first surface 110 can face each other and extend in the horizontal direction (the length direction indicated by arrow A), and short side 32 and second surface 120 can face each other and extend in the vertical direction (the direction indicated by arrow C). Since the expansion force of battery module 100 in the horizontal direction (for example, the length direction indicated by arrow A) is relatively small, the strength requirement for the fixed structure of battery cell 1 is accordingly lowered. Thus, battery cells 1 in battery module 100 can be bundled together with tying band 3. In some embodiments, battery module 100 can be secured by means including, but not limited to a pressure bar, a side plate, and a bolt. Tying band 3 has the advantages of light weight, small occupation size, and so on. Compared with other approaches, using tying band 3 to bundle the periphery of battery cells 1 can be advantageous for reducing the weight of battery module 100.

Optionally, battery module 100 can be provided with at least two tying bands 3, and tying bands 3 can be spaced apart in the width direction (the direction indicated by arrow B). In some embodiments, the number of tying bands 3, 4, or 5. In some embodiments, the number of typing bands can be equal to or more than 6.

As shown in FIGS. 9 and 10, battery module 100 can further include two end plates 2, which can be respectively disposed at two ends in the horizontal direction of the plurality of battery cells 1 (for example, the length direction indicated by arrow A). Tying band 3 can surround the outer periphery of the plurality of battery cells 1 and the two end plates 2, that is, tying band 3 can tie the two end plates 2 and the plurality of electric cells 1 together. End plate 2 can be made of metal material or non-metal materials. Exemplary metal materials can include, but not limited to aluminum and aluminum alloy. Exemplary non-metal materials can include, but not limited to a polymer material such as plastics through plastics technology.

As shown in FIG. 10, battery module 100 can further include an insulation part 4, and insulation part 4 can be made of an insulating material including, but not limited to rubber and silicon. Insulation part 4 can include at least a first face and a second face, wherein the first face can be perpendicular to the second face. Insulation part 4 can be arranged at the bottom of both ends of battery module 100 in the length direction, the first face can be opposed to a side surface of battery cell 1 at one end, and the second surface can opposed to the bottom surface of battery cell 1. Tying band 3 can surround the outer periphery of end plates 2, battery cells 1 and insulation part 4, such that end plates 2, battery cells 1 and insulation part 4 can be tied together. Insulation part 4 not only functions for insulation protection, but also prevents battery cell 1 from being locally tightened by tying band 3, in which uneven forces may be applied on the battery cell.

Figure 11:
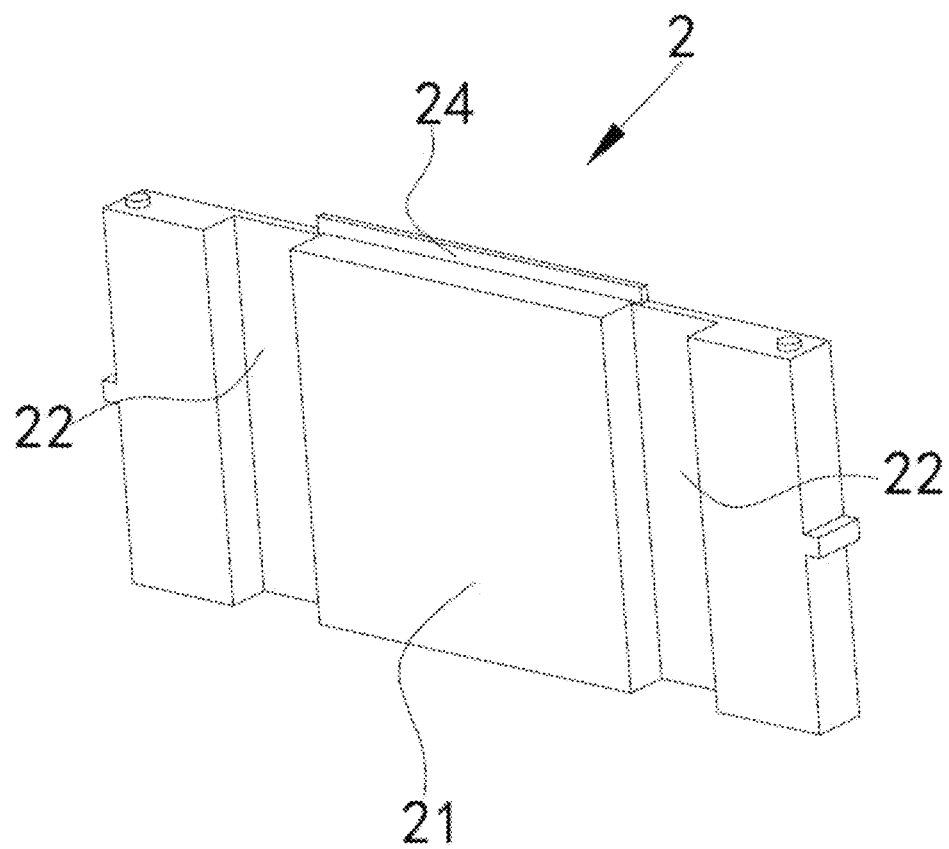
FIG. 11 is a schematic structural view of an end plate, according to some embodiments of the present disclosure.

FIG. 11 is a schematic structural view of end plate 2, according to some embodiments of the present disclosure. End plate 2 can include a main body 21 of end plate, a tying band limiting slot 22 and a first protruding portion 24, wherein tying band limiting slot 22 can be disposed on the outer surface of end plate 2, and can be formed by means of the outer surface of end plate 2 recessing inward. Tying band limiting slot 22 can extend in the vertical direction. Tying band 3 can pass through tying band limiting slot 22 such that short side 32 of tying band 3 can be received in tying band limiting slot 22. Tying band 3 can surround the outer periphery of the plurality of battery cells 1 and the end plates 2, wherein the width of tying band limiting slot 22 can be equivalent to the width of short side 32 of tying band 3, such that the position of tying band 3 can be defined.

Figure 12:
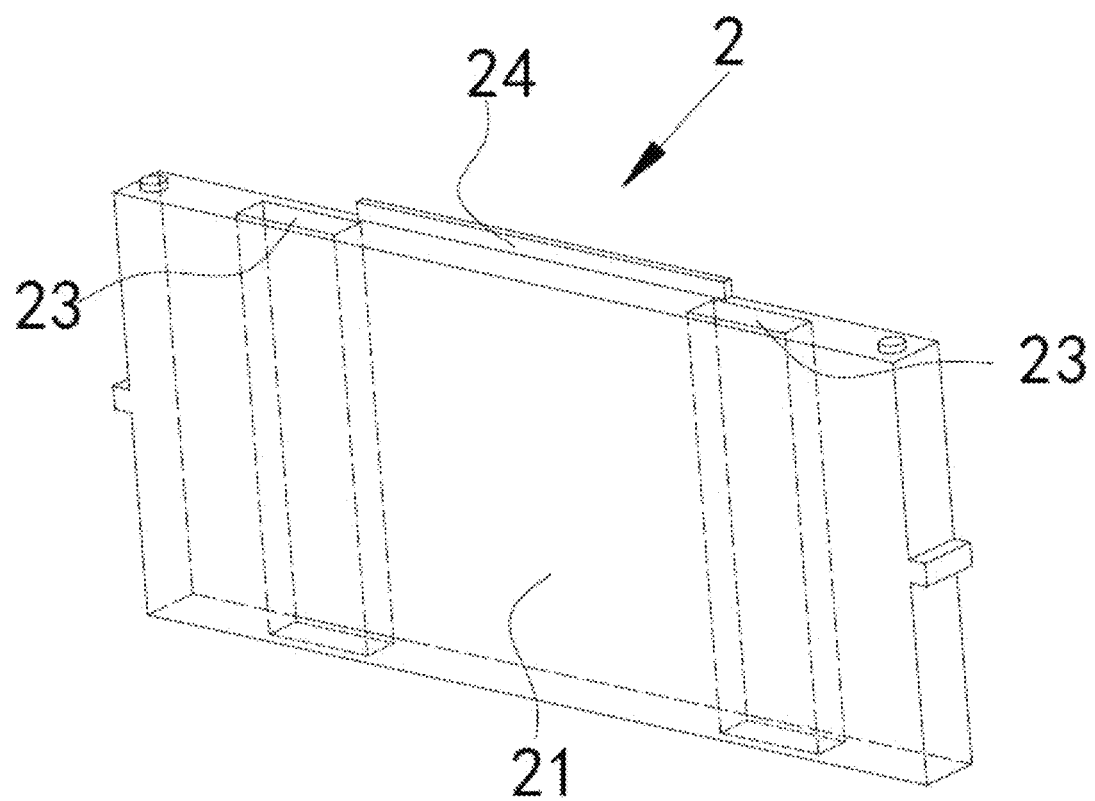
FIG. 12 is a schematic structural view of an end plate, according to some embodiments of the present disclosure.

FIG. 12 is a structural schematic view of end plate 2, according to some embodiments of the present disclosure. It is different from FIG. 11 in that a tying band limiting hole 23 can be provided on end plate 2 instead of tying band limiting slot 22 as shown in FIG. 8. Tying band limiting hole 23 can be located inside end plate 2 instead of on the surface. Similarly, tying band limiting hole 23 can also extend in the vertical direction. Short side 32 of tying band 3 can pass through tying band limiting hole 23. The width of tying band limiting hole 23 can be equivalent to the width of short side 32 of tying band 3, and tying band 3 can surround the outer periphery of the plurality of battery cells 1 and end plates 2.

In end plate 2 shown in FIGS. 11 and 12, a first protruding portion 24 can be provided at a top portion of main body portion 21. First protruding portion 24 can protrude from the upper surface of battery module 100 and can be located between long sides 31 of two adjacent tying bands. Therefore, first protruding portions 24 on the two end plates 2 and long sides 31 of the two adjacent tying bands 3 enclose a recess in the top portion of battery module 100. As shown in FIG. 12, in some embodiments, the top portion of battery module 100 can be connected to upper box cover 220 by top glue 230, and the recess formed by first protruding portion 24 and long sides 31 of tying band 3 can be used to accommodate top glue 230 and can limit the unsolidified glue and prevent the loss of the unsolidified glue.

Figure 13:
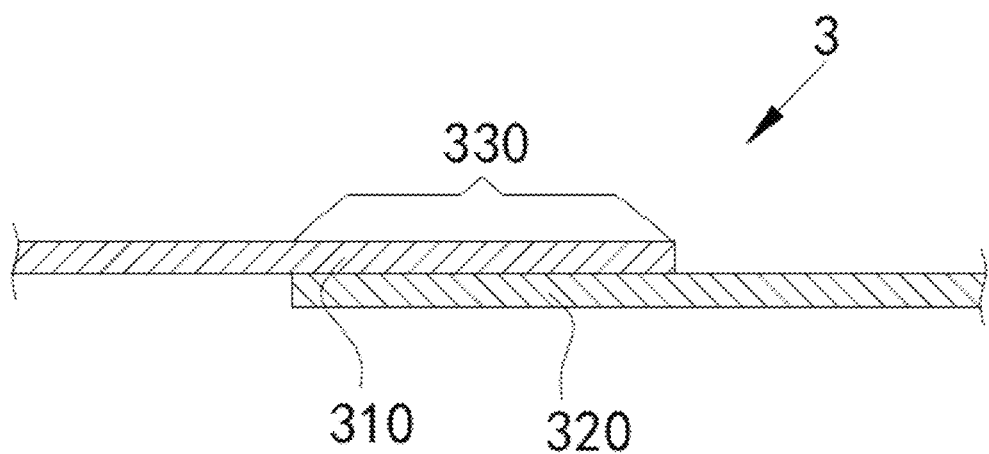
FIG. 13 is a cross-sectional view of a head-to-tail joint portion of a tying band, according to some embodiments of the present disclosure.

As shown in FIG. 13, which is a cross-sectional view of a head to tail joint portion of tying band 3, tying band 3 can have a first end portion 310 and a second end portion 320, wherein first end portion 310 and second end portion 320 respectively refer to one end and the other end when the tying band 3 is not head to tail connected. First end portion 310 and second end portion 320 can be stacked in the vertical direction (for example, the vertical direction indicated by arrow C) to form joint portion 330 such that joint portion 330 of tying band 3 and first surface 110 of battery cell 1 can face each other, that is, joint portion 330 can be located at the top portion of battery module 100. First end portion 310 and second end portion 320 of tying band 3 can be melted on the surface thereof and then joined together by means of heat pressing. In some embodiments, first end portion 310 and second end portion 320 can also be joined together by glue or staples.

In some embodiments, first end portion 310 and second end portion 320 can be stacked in a horizontal direction (for example, the length direction indicated by arrow A) to form joint portion 330, and joint portion 330 and second surface 120 of battery cell 1 can face each other, that is, joint portion 330 can be located at the end portion of battery module 100 in the horizontal direction.

In some embodiments, battery module 100 can have two or more tying bands 3, and joint portions 330 of tying bands 3 can be aligned in the width direction (that is, the direction indicated by arrow B). Since joint portion 330 can be formed by laminating first end portion 310 and second end portion 320, the thickness of joint portion 330 can be greater than the thickness of the remaining portion of tying band 3. In addition, since joint portions 330 of the respective tying bands 3 can be linearly arranged (that is, arranged in the width direction and substantially on the same straight line), it can be convenient to provide an escaping groove on box body 20, thereby preventing battery cells 1 from being pressed by box body 20 at the location of joint portion 330.

While the disclosure has been described in connection with certain embodiments, it is to be understood that the disclosure is not to be limited to the disclosed embodiments but, on the contrary, is intended to cover various modifications and equivalent arrangements included within the spirit and scope of the disclosure, which scope is to be accorded the broadest interpretation so as to encompass all such modifications and equivalent structures as is permitted under the law.

What is claimed is:

1. A battery module, comprising:
    a plurality of bus bars;
    a plurality of battery cells arranged in a horizontal direction and electrically connected to each other by the plurality of bus bars,
    each of the plurality of battery cells comprising:
        a battery case comprising two first surfaces and two second surfaces, an area of each of the first surfaces is larger than an area of each of the second surfaces, the two second surfaces of each of the battery cells face each other in the horizontal direction, and the two first surfaces of each of the battery cells face each other in a vertical direction, and
        a plurality of electrode assemblies accommodated in the battery case and stacked in the vertical direction, each electrode assembly comprising a first electrode sheet, a second electrode sheet, and a separator disposed between the first and second electrode sheets and having a flat wound structure or a laminated structure, in which the first and second electrode sheets and the separator are stacked in the vertical direction;
    two end plates respectively disposed at two ends of the plurality of battery cells in the horizontal direction, each of the two end plates comprising a first protruding portion that protrudes vertically from an upper surface of the plurality of battery cells;
    two tying bands surrounding an outer periphery of the plurality of battery cells and the two end plates, wherein each of the two tying bands comprises a first end portion, a second end portion, two long sides, and two short sides, wherein the two long sides face the two first surfaces and extend in the horizontal direction, and the two short sides face the two second surfaces and extend in the vertical direction, wherein the first end portion and the second end portion are stacked in one of the vertical direction and the horizontal direction to form a joint portion, wherein the first protruding portion of each of the two end plates is located between the two tying bands, and wherein the two first protruding portions and the two long sides of the two tying bands form a recess in a top portion of the battery module, the recess being configured to accommodate a glue; and
    insulating parts between the plurality of battery cells and the two end plates, the insulating parts configured to evenly distribute force from the tying band across the plurality of battery cells.

2. The battery module according to claim 1, wherein the number of layers of the battery cells stacked in the vertical direction is about one layer to five layers.

3. The battery module according to claim 2, wherein the number of layers of the battery cells stacked in the vertical direction is about two layers or three layers.

4. The battery module according to claim 1, wherein the battery case comprises a third surface, the two first surfaces and the two second surfaces collectively surround the third surface, and the area of each of the first surfaces is larger than an area of the third surface.

5. The battery module according to claim 4, wherein the battery cell comprises a first electrode terminal and a second electrode terminal, and the first electrode terminal and the second electrode terminal are both arranged on the third surface.

6. The battery module according to claim 1, wherein the two tying bands are spaced apart.

7. The battery module according to claim 6, wherein joint portions of the two tying bands are arranged in a straight line.

8. The battery module according to claim 1, wherein each of the two end plates further comprise one or more of:
    a surface away from the battery cell having a tying band limiting slot, the tying band limiting slot extends along the vertical direction, and the short side of the tying band is received in the tying band limiting slot; and
    a tying band limiting hole located inside each of the two the end plates, the tying band limiting hole extends along the vertical direction, and the short side of the tying band passes through the tying band limiting hole.

9. A battery pack, comprising:
    a plurality of battery modules within an accommodating chamber of a box body,
    each of the plurality of battery modules comprising:
        a plurality of bus bars;
        a plurality of battery cells arranged in a horizontal direction and electrically connected to each other by the plurality of bus bars,
        each of the plurality of battery cells comprising:
            a battery case comprising two first surfaces and two second surfaces, an area of each of the first surfaces is larger than an area of each of the second surfaces, the two second surfaces of each of the battery cells face each other in the horizontal direction, and the two first surfaces of each of the battery cells face each other in a vertical direction, and
            a plurality of electrode assemblies accommodated in the battery case and stacked in the vertical direction, each electrode assembly comprising a first electrode sheet, a second electrode sheet, and a separator disposed between the first and second electrode sheets and having a flat wound structure or a laminated structure, in which the first and second electrode sheets and the separator are stacked in the vertical direction;
        two end plates respectively disposed at two ends of the plurality of battery cells in the horizontal direction, each of the two end plates comprising a first protruding portion that protrudes vertically from an upper surface of the plurality of battery cells;
        two tying bands surrounding an outer periphery of the plurality of battery cells and the two end plates, wherein each of the two tying bands comprises a first end portion, a second end portion, two long sides, and two short sides, wherein the two long sides face the two first surfaces and extend in the horizontal direction, and the two short sides face the two second surfaces and extend in the vertical direction, wherein the first end portion and the second end portion are stacked in one of the vertical direction and the horizontal direction to form a joint portion, wherein the first protruding portion of each of the two end plates is located between the two tying bands, and wherein the two first protruding portions and the two long sides of the two tying bands form a recess in a top portion of the battery module, the recess being configured to accommodate a glue; and insulating parts between the plurality of battery cells and the two end plates, the insulating parts configured to evenly distribute force from the tying band across the plurality of battery cells.

10. A vehicle, comprising:

a battery pack within a vehicle body, the battery pack comprising a plurality of battery modules within an accommodating chamber of a box body, each of the plurality of battery modules comprising:

a plurality of bus bars;

a plurality of battery cells arranged in a horizontal direction and electrically connected to each other by the plurality of bus bars, each of the plurality of battery cells comprising:

a battery case comprising two first surfaces and two second surfaces, an area of each of the first surfaces is larger than an area of each of the second surfaces, the two second surfaces of each of the battery cells face each other in the horizontal direction, and the two first surfaces of each of the battery cells face each other in a vertical direction, and a plurality of electrode assemblies accommodated in the battery case and stacked in the vertical direction, each electrode assembly comprising a first electrode sheet, a second electrode sheet, and a separator disposed between the first and second electrode sheets and having a flat wound structure or a laminated structure, in which the first and second electrode sheets and the separator are stacked in the vertical direction;

two end plates respectively disposed at two ends of the plurality of battery cells in the horizontal direction, each of the two end plates comprising a first protruding portion that protrudes vertically from an upper surface of the plurality of battery cells;

two tying bands surrounding an outer periphery of the plurality of battery cells and the two end plates, which are respectively arranged at two ends of the plurality of battery cells in the horizontal direction, the tying band comprising wherein each of the two tying bands comprises a first end portion, a second end portion, two long sides, and two short sides, wherein the two long sides face the two first surfaces and extend in the horizontal direction, and the two short sides face the two second surfaces and extend in the vertical direction, wherein the first end portion and the second end portion are stacked in one of the vertical direction and the horizontal direction to form a joint portion, wherein the first protruding portion of each of the two end plates is located between the two tying bands, and wherein the two first protruding portions and the two long sides of the two tying bands form a recess in a top portion of the battery module, the recess being configured to accommodate a glue; and insulating parts between the plurality of battery cells and the two end plates, the insulating parts configured to evenly distribute force from the tying band across the plurality of battery cells.

\* \* \* \* \*